(12) United States Patent
Baggenstoss

(10) Patent No.: US 8,185,490 B1
(45) Date of Patent: May 22, 2012

(54) CLASS-SPECIFIC ITERATED SUBSPACE CLASSIFIER

(75) Inventor: Paul M. Baggenstoss, Newport, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 545 days.

(21) Appl. No.: 12/536,157

(22) Filed: Aug. 5, 2009

(51) Int. Cl.
*G06F 17/00* (2006.01)
*G06F 15/18* (2006.01)
*G06N 5/02* (2006.01)

(52) U.S. Cl. ............................................ 706/48; 706/12
(58) Field of Classification Search .................... 706/12, 706/46, 48
See application file for complete search history.

(56) References Cited

U.S. PATENT DOCUMENTS 6,466,908 B1 * 10/2002 Baggenstoss ................. 704/256
6,535,641 B1    3/2003 Baggenstoss

OTHER PUBLICATIONS

Harrison, B.F. et al. "Hybrid Discriminative/Class-Specific Classifiers for Narrowband Signals", IEEE Transactions on Aerospace and Electronic Systems, vol. 44, No. 2, Apr. 2008. pp. 629-642.*
Baggenstoss, P.M. "Class-Specific Classifier: Avoiding the Curse of Dimensionality", IEEE A&E Systems Magazine, vol. 19, No. 1. Jan. 2004. pp. 37-52.*
Baggenstoss, P.M. "Iterated Class-Specific Subspaces for Speaker-Dependent Phoneme Classification", EUSIPCO 2008 Proceedings, 16th European Signal Processing Conference, Aug. 25-29, 2008. Lausanne, Switzerland. 5 pages. Available online: http://www.eurasip.org/Proceedings/Eusipco/Eusipco2008/papers/1569103176.pdf.*
Paul M. Baggenstoss, The PDF Projection Theorem and the Class-Specific Method, paper, Mar. 2003, pp. 672-685, vol. 51, No. 3, IEEE, USA.
Steven M. Kay et al., Multidimensional Probability Density Function Approximations for Detection, Classification, and Model Order Selection, paper, Oct. 2001, pp. 2240-2252, vol. 49, No. 10, IEEE, USA.

\* cited by examiner

*Primary Examiner* — Jeffrey A Gaffin
*Assistant Examiner* — Benjamin Buss
(74) *Attorney, Agent, or Firm* — James M. Kasischke; Michael P. Stanley; Jean-Paul A. Nasser

(57) ABSTRACT

A method is provided for calculating a class-specific iterated subspace for a classification system utilized in a computing system. Training data in the specific class for the class-specific iterated subspace is collected. A linear orthogonal transform is applied transforming the data into at least one bin. Magnitude squared bins are calculated and used as columns of a matrix. Orthonormal vectors of this matrix are selected and a J function is calculated. The J function and orthonormal starting vectors are used to obtain the class-specific iterated subspace for each class. The method further applies these class-specific iterated subspaces in a classification system for determining the most likely class of a data signal of interest.

12 Claims, 3 Drawing Sheets

CLASS-SPECIFIC ITERATED SUBSPACE CLASSIFIER

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED PATENT APPLICATIONS

None.

BACKGROUND OF THE INVENTION (1) Field of the Invention

The present invention generally relates to a class-specific signal analysis method using a subspace that maximizes class-specific J-functions.

(2) Description of the Prior Art

Characterizing an input signal using automated data processing systems is a common problem in many fields. In sonar, it is often desirable to separate natural sources from manmade sources. This is also true in radar. In speech recognition, it is desirable to recognize phonemes so that speech can be turned into text. In virtually all state-of-the-art methods, the process of characterizing the data is divided into two separate stages. In the first stage, it is necessary to extract features (useful information in the form of a compact set of parameters) from the input data that is useable by automatic recognition algorithms. In the second stage, an algorithm, usually a probabilistic model, decides which type of signal is present based on the features.

An example of such a system is automatic speech recognition (ASR) system as implemented on a computer. In the first stage of a state-of-the-art ASR system, the speech signal is divided into equal-sized segments, from which features are extracted. These features are usually extracted in mel-scale cepstral format because this format focuses on the frequency response of human hearing.

The mel-scale cepstrum is calculated by taking the Fourier transform of a time domain signal to produce a spectrum. Powers of the spectrum are mapped onto the mel scale. Logarithms are taken of the powers at each of the mel frequencies. A discrete cosine transform is calculated for the logarithms of the mel powers. The mel-scale cepstral coefficients are the calculated discrete cosine transform coefficients. In ASR systems, the mel-scale cepstral coefficients are used as the feature set for recognizing phonemes.

In mathematical terms, one may write the MEL cepstrum features as $$z = DCT(\log(A'y)) \quad (1)$$

where vector y is the length–N/2+1 spectral vector, the magnitude-squared DFT output and the columns of A are the MEL band functions, and the "prime" notation indicates the transpose of the matrix A. The logarithm and the discrete cosine transform (DCT) are invertible functions. There is no dimension reduction or information loss so they may be considered a feature conditioning step, which results in more Gaussian-like and independent features.

Other approaches of feature set development are taught in the prior art. The use of signal-dependent or class-dependent features for classification, known as the class-specific method or CSM, is covered in U.S. Pat. No. 6,535,641, "Class-Specific Classifier". The probability density function (PDF) projection theorem (PPT) is disclosed in Baggenstoss, "The PDF Projection Theorem and the Class-Specific Method", IEEE Transactions on Signal Processing, Vol. 51, No. 3 (March 2003) which is incorporated by reference. The probability density function projection theorem eliminates the need for sufficient statistics and allows the use of class-dependent reference hypotheses, improving the performance of any classification system using class-dependent features. U.S. Pat. No. 6,466,908, entitled "System and Method for Training a Class-specific Hidden Markov Model Using a Modified Baum-Welch Algorithm" alleviates the need for a common feature set in a HMM.

The key operation here is dimension reduction by linear projection onto a lower-dimensional space. Now, with the introduction of the class-specific method (CSM) and the PDF projection theorem (PPT), one is free to explore class dependent features within the rigid framework of Bayesian classification. Some work has been done in class-dependent features; however, existing approaches are only able to use different features by using compensation factors to make likelihood comparisons fair. Such approaches work if the class-dependent feature transformations are restricted to certain limited sets. Both methods fall short of the potential of the PPT, which makes no restriction on the type of feature transformations available to each phoneme. Under CSM, the "common feature space" is the time-series (raw data) itself. Feature PDFs, evaluated on different feature spaces are projected back to the raw data space where the likelihood comparison is done. Besides its generality, the CSM paradigm has many additional advantages as well. For example, there is a quantitative class-dependent measure to optimize that allows the design of the class-dependent features in isolation, without regard to the other classes.

A prior art classifier is shown in FIG. 1. The classifier 2 receives data from a data source 4. Data source 4 is joined to a feature transformation module 6 for developing a feature set. The feature set is provided to pattern match processors 8, which correspond to each data class. Pattern match processors 8 provide an output measuring the developed feature set against trained data. The pattern match processor 8 outputs are compared in a comparison 9 and the highest output is selected.

FIG. 2 shows a class specific classifier as disclosed in U.S. Pat. No. 6,535,641 which is incorporated by reference herein. In this classifier, a data source 10 supplies a raw data sample X to the processor 12 at a processor input 14. It is assumed that the data source can be type A, B, or C, but the identity is not known. Processor output 16 is a decision concerning the identity of the data source, i.e. A, B, or C. The processor 12 contains one feature transformation section 18 for each possible data class. These sections 18 are joined to receive the raw data X at processor input 14. Each feature transformation section 18 produces a feature set for its respective class. The processor 12 further contains pattern match processors 20 with each pattern match processor joined to a transformation section 18 for receiving a feature set associated with one class. The pattern match processors 20 approximate the probability density functions (PDFs) of the feature sets for data sampled from the corresponding data class. The output of the pattern match processors 20 are highest when the input feature set is similar to or "matches" the typical values of the training set. Because the pattern match processors 20 are operating on different feature sets, the outputs cannot be directly compared to arrive at a decision without compensation. Compensation processors 22 process the raw data X together with the feature set, $Z_j$, and provide a correction term in accordance with the PPT, which, when multiplied by the output of pattern match processors 20, convert the PDFs of feature sets $Z_j$, into PDF of the raw data X. The outputs of the compensation processors 22, called the "J function" in the terminology of the class-specific classifier, are passed to a multiplier 24 which multiplies this output with the output of the pattern match processors 20. The result of the multiplication 24, which is an estimate of the PDF of the raw data X for the given class, is processed by a comparison 26 joined to the processor 12 output 16. The output 16 is the identity of the data class that has the highest output from the multiplier 24.

SUMMARY OF THE INVENTION

Accordingly, there is provided a method for calculating a class-specific iterated subspace for a classification system utilized in a computing system. Training data in the specific class for the class-specific iterated subspace is collected. A linear orthogonal transform is applied transforming the data into at least one bin. Magnitude squared bins are calculated and used as columns of a matrix. Orthonormal vectors of this matrix are selected and a J function is calculated. The J function and orthonormal starting vectors are used to obtain the class-specific iterated subspace for each class. The method further applies these class-specific iterated subspaces in a classification system for determining the most likely class of a data signal of interest.

BRIEF DESCRIPTION OF THE DRAWINGS

The foregoing features of the present invention will become more readily apparent and may be understood by referring to the following detailed description of an illustrative embodiment of the present invention, taken in conjunction with the accompanying drawings, in which.

DETAILED DESCRIPTION OF THE INVENTION

Figure 1:
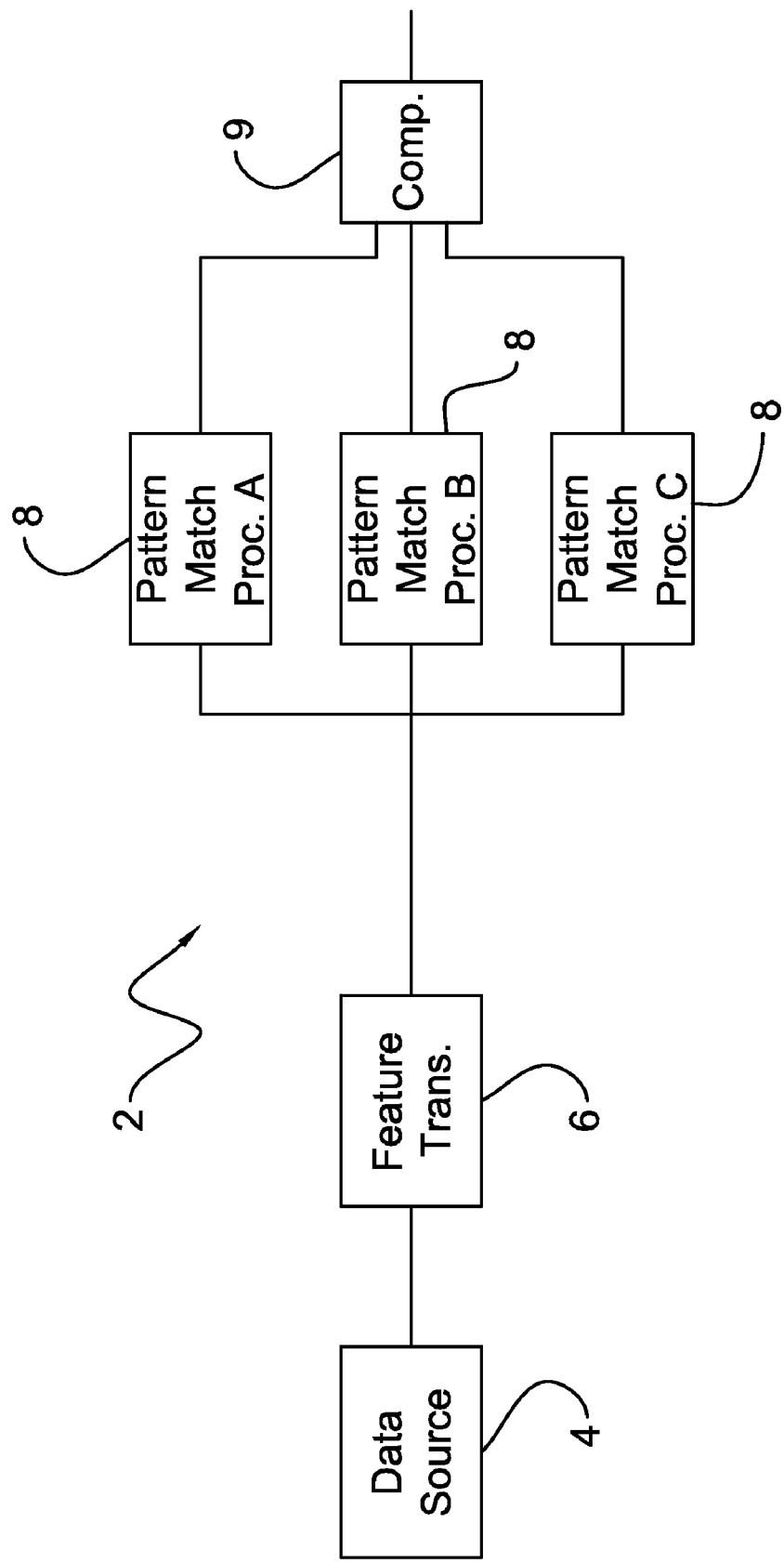
FIG. 1 is a diagram of a prior art classifier using conventional technology.
Figure 2:
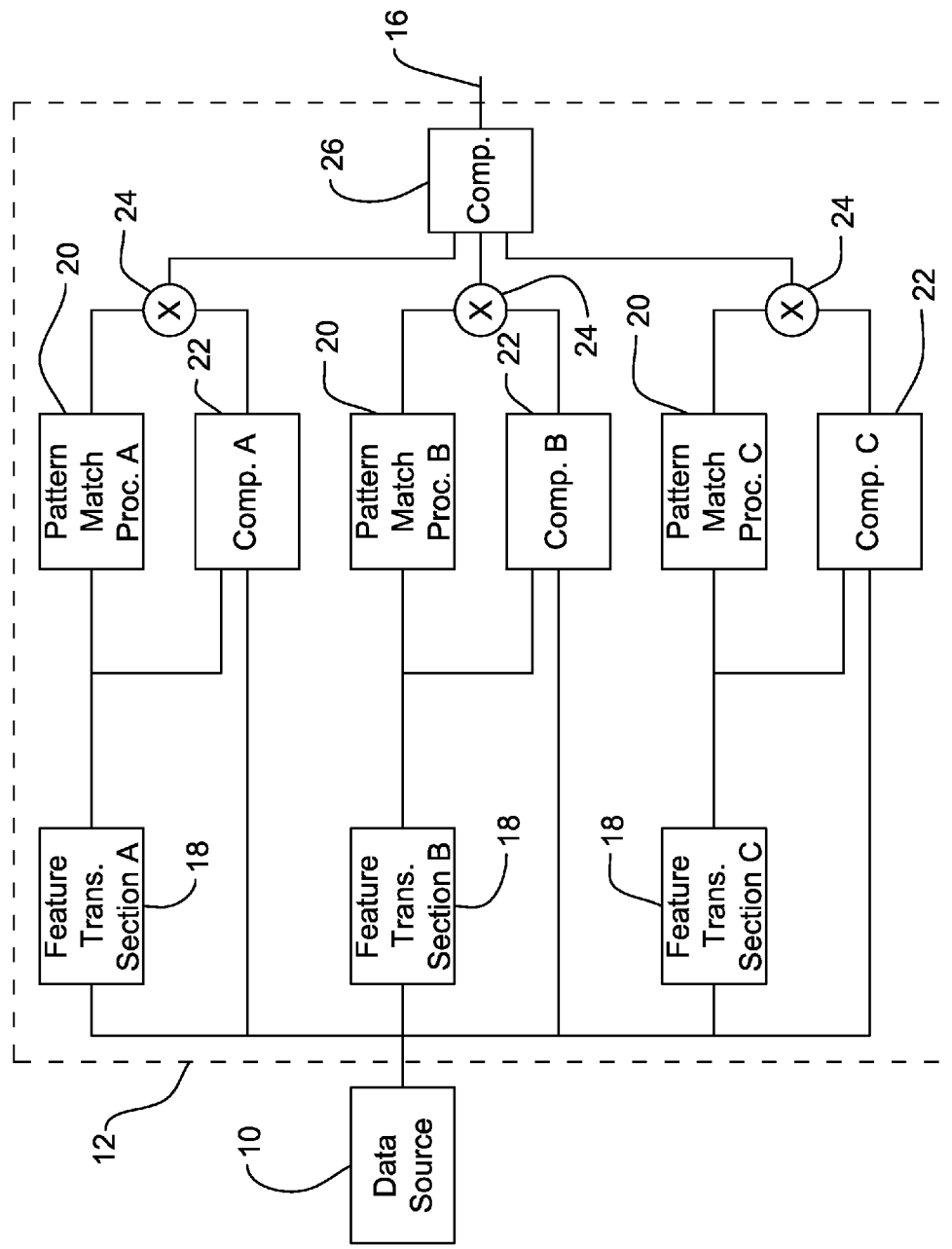
FIG. 2 is a diagram of a prior art class specific classifier.

When applying the class specific method, one must find class-dependent signal processing to produce features that characterize each class. This invention applies specifically to class-specific classifiers in which the features are produced by these three steps (1) applying a Fourier transform or discrete Fourier transform to the input data to obtain a power spectral vector y, (2) then the multiplication of a spectral vector y by a dimension-reducing matrix A, then (3) optionally applying a feature conditioning transformation. While the Fourier transform and discrete Fourier transform are explicitly mentioned here, it is understood by those skilled in the art that other transforms could be used for this. These transforms include the discrete cosine transform, wavelet transform and the like. We seek an automatic means of optimizing the matrix A for a given class. We first review the class specific method.

Let there be M classes among which we would like to classify. The class-specific classifier, based on the PPT, is given by $$\arg\max_m p_p(x \mid H_m), \tag{2}$$

where $p_p(x|H_m)$ is the projected PDF (projected from the feature space to the raw data space). The projected PDF is given by $$p_p(x|H_m) = J_m(x, A_m, H_{0,m}) \hat{p}(z_m | H_m) \tag{3}$$

where $\hat{p}(z_m|H_m)$ is the feature PDF estimate (estimated from training data) and the J-function is given by $$J_m(x, A_m, H_{0,m}) = \frac{p(x \mid H_{0,m})}{p(z_m \mid H_{0,m})} \tag{4}$$

and $H_{0,m}$ are class-dependent reference hypotheses. In the remainder of the discussion, we drop the subscript m in the interest of simplicity, leaving a common reference hypothesis denoted by $H_0$. In accordance with the above described 3-step method, the class-dependent features $z_m$ are computed from the spectral vector y through the class-dependent subspace matrices $A_m$, as $$z_m = C(A'_m y) \tag{5}$$

where C is the feature conditioning transformation where the "prime" notation indicates the transpose of matrix $A_m$. Note that the J function is a fixed function of x precisely defined by the feature transformation from x to z and the reference hypotheses $H_{0,m}$.

It is the "compensation term" that allows feature PDFs from various feature spaces to be compared fairly because the resulting log-likelihood function is a PDF on the raw data space x. The J function is a generalization of the determinant of the Jacobian matrix in the case of a 1:1 transformation. The PPT guarantees that $p_p(x|H_m)$ given by (3) is a PDF, so it integrates to 1 over x regardless of the reference hypothesis $H_{0,m}$ or the feature transformation producing $z_m$ from x. It is up to the designer to choose $H_{0,m}$ and $A_m$ to make $p_p(x|H_m)$ as good an estimate of $p(x|H_m)$ as possible. The designer is guided by the principle that if $z_m$ is a sufficient statistic for $H_m$ then $p_p(x|H_m)$ will equal $p(x|H_m)$ (provided $\hat{p}(z_m|H_m)$ is a good estimate). We can also think of it as a way of imbedding a low-dimensional PDF within a high-dimensional PDF. We have good reason, as we shall see, to use a common reference hypothesis, $H_0$ which simplifies the classifier to $$\arg\max\ J_m(x, A_m, H_0) p(z_m|H_m) \tag{6}$$

where the J function, $J_m(x)$, now depends only on $A_m$. Note that in contrast to other class-dependent schemes using pair-wise or tree tests, the class specific method is a Bayesian classifier and has the promise of providing a "drop-in" replacement to the MEL cepstrum based feature processors in existing ASR systems. The J function for this specific feature set is covered in Steven M. Kay and Albert H. Nuttall and Paul M. Baggenstoss, *Multidimensional Probability Density Function Approximation for Detection, Classification and Model Order Selection*, IEEE Trans. Signal Processing, October, 2001, which is incorporated by reference herein.

We are interested in adapting the matrix A to an individual class. We propose the strategy of selecting $A_m$ to maximize the total log-likelihood of the training data using the projected PDF. Let $$L(x^1, x^2 \ldots x^k; A_m) = \sum_{i=1}^{K} \log p_p(x^i \mid H_m) \qquad (7)$$

where K is the number of training vectors. If we expand $p_p(x|H_m)$, we obtain:

$$p_P(x \mid H_m) = \left[\frac{p(x \mid H_0)}{p(z_m \mid H_0)}\right] \hat{p}(z_m \mid H_m), \qquad (8)$$

where $H_0$ is the independent Gaussian noise hypothesis, we see that the term $p(x|H_0)$ is independent of $A_m$. Thus, to maximize L, we need to maximize the average value of $$\log \hat{p}(z_m|H_m) - \log p(z_m|H_0) \qquad (9)$$

It is difficult to determine how the first term $\hat{p}(z_m|H_m)$ is affected by changing $A_m$. To determine the effect of changing $A_m$, new feature vectors $z_m$ need to be calculated for each training sample, then the PDF needs to be re-estimated and $\hat{p}(z_m|H_m)$ needs to be evaluated for each training sample. On the other hand, given the simplicity of the reference hypothesis $H_0$, the second term $p(z_m|H_0)$ can be known, either in analytic form or in an accurate analytic approximation. This is taught by Kay et al., "Multidimensional Probability Density Function Approximations for Detection Classification, and Model Order Selection," IEEE Transactions on Signal Processing, Vol. 49, No. 10, pp. 2240-2252, (October 2001), which is incorporated by reference herein. Furthermore, the first term can be made nearly independent of $A_m$, by requiring $A_m$ to be orthonormal. We proceed, then by ignoring the term $\hat{p}(z_m|H_m)$ and maximizing the function $$Q(x^1, x^2 \ldots x^K; A_m) = -\sum_{i=1}^{K} \log p(z_m^i \mid H_0). \qquad (10)$$

The change in $\hat{p}(z_m|H_m)$ can be minimized as $A_m$ is changed by insisting on an orthonormal form for $A_m$. Thus, by maximizing L (7) under the restriction that $A_m$ is orthonormal, we approximately maximize L. Constraining $A_m$ such that the columns of $A_m$ are an orthonormal set of vectors. We use a orthonormality under the inner product:

$$<x, y> = \sum_{i=0}^{N/2} \epsilon_i x_i y_i, \qquad (11)$$

where $\epsilon_i$ has the value of the number of degrees of freedom in spectral bin i. For a discrete Fourier transform, $\epsilon_i$ has the value 2 except for the end bins (0 and N/2) where it has value 1. Ortho-normality under this inner product means that the spectral vectors will be orthonormal if extended to the full N bins. Use of orthonormality helps to stabilize the term as $A_m$ is varied.

$A_m$ is further constrained with respect to energy sufficiency. The energy sufficiency constraint means that the total energy in x, $$E = \sum_{i=1}^{N} x_i^2 \qquad (12)$$

can be derived from the features. Energy sufficiency is important in the context of floating reference hypotheses. In order that the classifier result is scale invariant, we need energy sufficiency. With energy sufficiency, the term $$\frac{p(x \mid H_0)}{p(z_m \mid H_0)} \qquad (13)$$

will be independent of the variance used on the $H_0$ reference hypothesis. Note that $E = e'_1 y/N$, where $e_1 = [1, 2, 2, 2 \ldots, 2, 1]'$, which is composed of the number of degrees of freedom in each frequency bin. Thus, energy sufficiency means that the column space of $A_m$ needs to contain the vector $e_1$.

Since we would like the feature set created by projecting onto the columns of A to characterize the statistical variations within the class, a natural first step is to use principal component analysis (PCA). To do this, we arrange the spectral vectors from the training set into a matrix $$Y = [y^1 \, y^2 \ldots y^K] \qquad (14)$$

where K is the number of training vectors. To meet the energy sufficiency constraint, we fix the first column of A to be the normalized $e_1$ identified as $\tilde{e}_1$:

$$\tilde{e}_1 = \frac{e_1}{\|e_1\|} \qquad (15)$$

To find the best linear subspace orthogonal to $e_1$, we first orthogonalize the columns of Y to $e_1$ $Y_n = Y - (\tilde{e}_1'Y)$. Let U be the largest P singular vectors of $Y_n$, or equivalently the largest P eigenvectors of $Y_n Y'_n$. P is chosen to maximize the resulting performance. P is usually between 3 and 10 as determined experimentally. We then set $A = [\tilde{e}_1 U]$. We then proceed to maximize (10) using steepest ascent, or any of a number of standard optimization techniques. That is to say, the value of equation (10) is determined, and then matrix A is modified in some manner according to the optimization technique, then equation (10) is re-calculated to determine the effect of the modification. Convergence is determined when no further significant increase in (10) is possible. We use the term class-specific iterated subspace (CSIS) to refer to the columns of $A_m$ obtained in this way.

This method has been used with known experimental data (the TIMIT data set) as a source of phonemes. The data consists of sampled time-series (in 16 kHz .wav files) of scripted sentences read by a wide variety of speakers and includes index tables that point to start and stop samples of each spoken phoneme in the text. In TIMIT, each speaker is identified by the dialect region speaker, and phoneme. Dialect region takes values from 1-8. The speaker is identified by a 5 character code such as FDAWO or MGRLO. The initial letter F or M indicates the sex of the speaker. There are 61 phonemes in the database, having a 1 to 4 character code. We use the term dataclass to represent the collection of all the phonemes of a given type from a given speaker. The average number of utterances of a given speaker/phoneme combination is about 10 and ranges from 1 up to about 30 for some of the most common phonemes. Speaker/phoneme combinations with no fewer than 10 samples were used.

In all of our classification experiments, the utterances of a given speaker/phoneme were divided into two sets, even (samples 2, 4, 6 . . . ) and odd (samples 1, 3, 5 . . . ). We conducted two sub-experiments, training on even, testing on odd, then training on odd, testing on even. We reported the sum of the classification counts from the two experiments.

We now describe the processing for the features of the MEL cepstrum classifier (MCC) and CSIS. In order to concentrate on the basic dimension reduction step (equation 2), the simplest possible processing and PDF modeling was used. Each step in the processing is described below, in the order in which it is processed.

The phoneme data was pre processed by resampling from 16 kHz down to 12 kHz. Phoneme endpoints were correspondingly converted and used to select data from the 12 kHz time-series. The phoneme data was also truncated to a multiple of 384 samples by truncating the end. Those phoneme events that were below 384 samples at 12 kHz were not used. Doing this allowed us to use fast Fourier transform (FFT) sizes of 48, 64, 96, 128, or 192 samples, which are all factors of 384.

We computed non-overlapped unshaded (rectangular window function) FFTs resulting in a sequence of magnitude-squared FFT spectral vectors of length N/2+1, where N is the FFT size. The number of FFTs in the sequence depended on how many non-overlapped FFTs fit within the truncated phoneme utterance.

Spectral vectors were normalized after FFT processing. For non-speaker-dependent (MEL cepstrum) features, the spectral vectors were normalized by the average spectrum of all available data. For class specific iterated subspace (CSIS) (speaker-dependent) features, the spectral values for each speaker/phoneme combination were normalized by the average spectrum for that speaker/phoneme. In classification experiments, the average spectrum was computed from the training data to avoid issues of data separation.

Next, the spectral vectors, denoted by y, were projected onto a lower dimensional subspace by a matrix as in (2) resulting in feature vectors, denoted by w. For the mel cepstrum classifier, the columns of A were mel frequency band functions. The number of columns in matrix A was $N_c+2$ including the zero and Nyquist half-bands. (see FIG. 1). For CSIS, A was an orthonormal matrix determined from the optimization algorithm. For CSIS, the number of columns of A was P+1 where P is the number of basis functions in addition to the first column $\tilde{e}_1$.

From a statistical point of view, feature conditioning has effect on the information content of the features. It does, however, make probability density function (PDF) estimation easier if the resulting features are approximately independent and Gaussian. For MCC, the features were conditioned by taking the logarithm and discrete cosine transform as in (1). For CSIS, features were conditioned first by dividing features 2 through P+1 by the first feature. This effectively normalizes the features since the first feature, being a projection onto $e_1$, is a power estimate for the segment. Lastly, the logarithm of the first feature is taken. Mathematically, we have for CSIS $$w = A'y \quad (16)$$

$$z_1 = \log(w_1) \quad (17)$$

$$z_i = w_i/w_1, \ i=2, 3, \ldots P+1 \quad (18)$$

J-function contributions must be included for FFT magnitude-squared, spectral normalization, matrix multiplication, and feature conditioning.

We used a simple multivariate Gaussian PDF model, or equivalently a Gaussian mixture model (GMM) with a single mixture component. We assume independence between the members of the sequence within a given utterance, thus disregarding the time ordering. The log-likelihood value of a sample was obtained by evaluating the total log-likelihood of the feature sequence from the phoneme utterance. The reason we used such simplified processing and PDF models was to concentrate our discussion on the features themselves.

Classification was accomplished by maximization of log-likelihood across class models. For CSS and CSIS, we added the log J-function value to the log-likelihood value of the Gaussian mixture model, implementing (6) in the logarithm domain.

Figure 3:
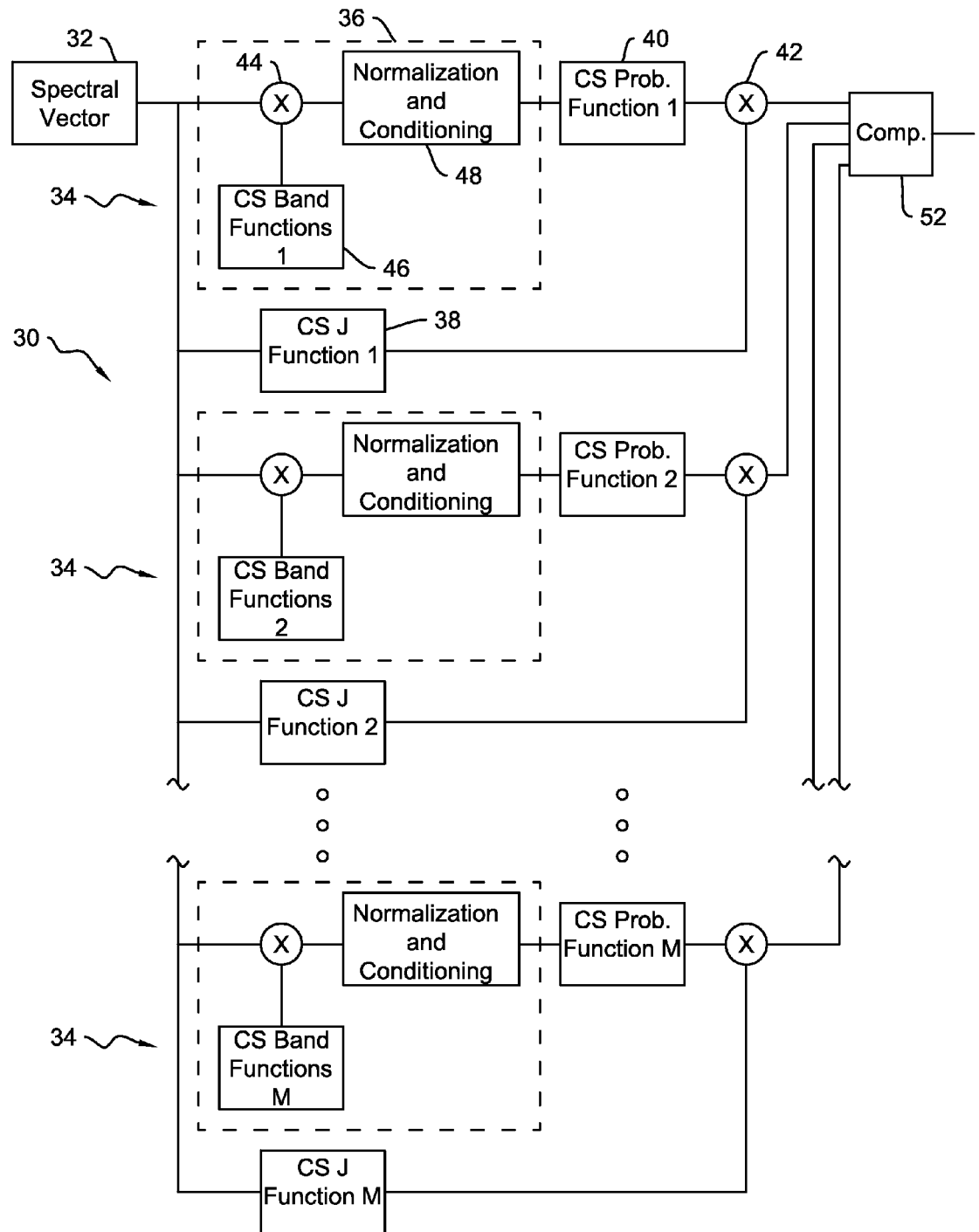
FIG. 3 is a diagram of a class specific classifier implementing aspects of the current invention.

FIG. 3 shows the class specific iterative subspace classifier 30 used in operation. A spectral vector 32 provides classifier 30 with input y. Input is provided to class specific processing sections 34 which are each associated with and specific to a certain class of input. Each processing section 34 includes a class specific (CS) feature transform section 36, a CS J function section 38, a CS probability function section 40, and a multiplier 42. CS band functions, J functions and probability functions are computed for each class using iterative optimization before implementation of the classifier 30 according to the method taught above. Iterative optimization adjusts the CS band function 46 for each class to maximize output from multiplier 42 for that class. Since it is impractical to predict the output of probability function 40, the method assumes that function 40 does not change when the CS band function is adjusted. The method, thus, concentrates on maximizing only output from J-function 38. By keeping band functions 46 normalized (orthonormal), the method minimizes the changes in function 40 during the optimization.

The CS feature transform section 36 includes a multiplier 44 receiving output (y) from spectral vector 32 and multiplying it by the CS band functions 46 for the associated class ($A_m$) producing a CS modified spectral vector. The CS band functions are class specific versions of the MEL band functions A used in conventional MEL cepstrum analysis. The CS band functions 46 are computed as disclosed above. The CS modified spectral vector is provided to normalization and conditioning section 48. Normalization and conditioning can be by conventionally known methods such as discrete cosine transforms, discrete Fourier transforms and the like. It is preferred that this section provide valid results for negative inputs, so logarithmic processing is not desired. Normalization and conditioning section 48 produces CS transformed data ($z_m$). The CS transformed data is provided as input to the CS probability function section 40. CS probability function section 40 provides an output indicating how well the CS transformed data matches the associated class. CS J function section 38 receives input from spectral vector 32 and calculates a CS correction vector. Multiplier 42 receives the CS probability function section 40 output and the CS correction vector from the CS J function section 38. As an output, multiplier 42 provides a measure of how well the CS transformed data matches the associated class that is comparable among all of the classes. Comparator 52 receives the comparable matching data and provides an output signal indicating the class that is most likely to match that of the incoming spectral data.

What is claimed is:

1. A method for calculating a class-specific iterated subspace for a classification system utilized in a computing system comprising:
collecting training data related to a signal of interest, said training data being in the specific class for the class-specific iterated subspace;
applying a linear orthogonal transform to the collected training data resulting in transformed training data in at least one bin;
calculating the magnitude-square of each bin of the transformed training data producing magnitude-squared bins;
arranging the magnitude-squared bins as columns y in a matrix Y;
selecting orthonormal starting vectors from said matrix Y;
creating a J function using said selected orthonormal starting vectors; and
iteratively maximizing a sum of the logarithm of said created J function by adjusting said orthonormal starting vectors to obtain the class-specific iterated subspace.

2. The method of claim 1 wherein said linear orthogonal transform is one transform selected from the group of transforms including Fourier transforms, discrete Fourier transforms, wavelet transforms, and discrete cosine transforms.

3. The method of claim 1 wherein the step of selecting orthonormal starting vectors utilizes principle component analysis of said matrix Y.

4. The method of claim 3 wherein from three to ten orthonormal starting vectors are selected as the largest singular columns of said matrix Y.

5. The method of claim 3 wherein from three to ten orthonormal starting vectors are selected as the largest eigenvectors of a column of said matrix Y multiplied by a transpose of the column.

6. The method of claim 1 wherein the step of iteratively maximizing a sum of the logarithm of said created J function comprises:
modifying the orthonormal starting vectors; and
recalculating said created J function until said sum of the logarithm substantially stops changing.

7. A method for classifying a signal of interest in a computing system as being in a most likely class comprising the steps of:
calculating a class-specific iterated subspace for each class of a classification system before classifying the signal of interest comprising the steps of:
collecting training data related to the signal of interest, said training data being in the specific class for the class-specific iterated subspace;
applying a linear orthogonal transform to the collected training data resulting in transformed training data in at least one bin;
calculating the magnitude-square of each bin of the transformed training data producing magnitude-squared bins;
arranging the magnitude-squared bins as columns y in a matrix Y;
selecting orthonormal starting vectors from said matrix Y;
creating a J function using said selected orthonormal starting vectors;
iteratively maximizing a sum of the logarithm of said created J function by adjusting said orthonormal starting vectors to obtain the class-specific iterated subspace;
receiving a data signal of interest with an unknown data class as a spectral vector;
multiplying the spectral vector by the obtained class specific iterated subspace to obtain a class specific vector for each class;
normalizing and conditioning each class specific vector for each class;
calculating a class specific likelihood function for each class indicating a probability that the normalized and conditioned class specific vector is in the associated class;
calculating a specific J function for each class utilizing the maximized J function for the specific class and the spectral vector;
compensating each said calculated class specific likelihood function using said specific J-function for each class;
comparing each compensated likelihood function for each class against the other compensated likelihood functions; and
providing a result indicating the most likely class for the compensated likelihood function having the greatest value.

8. The method of claim 7 wherein said linear orthogonal transform is one transform selected from the group of transforms including Fourier transforms, discrete Fourier transforms, wavelet transforms, and discrete cosine transforms.

9. The method of claim 7 wherein the step of selecting orthonormal starting vectors utilizes principle component analysis of said matrix Y.

10. The method of claim 9 wherein from three to ten orthonormal starting vectors are selected as the largest singular columns of said matrix Y.

11. The method of claim 9 wherein from three to ten orthonormal starting vectors are selected as the largest eigenvectors of a column of said matrix Y multiplied by a transpose of the column.

12. The method of claim 7 wherein the step of iteratively maximizing a sum of the logarithm of said created J function comprises:
modifying the orthonormal starting vectors; and
recalculating said created J function until said sum of the logarithm substantially stops changing.

* * * * *